United States Patent
Azuma

[11] Patent Number: 6,067,314
[45] Date of Patent: May 23, 2000

[54] DIRECT SPREAD SPECTRUM SIGNAL RECEIVING APPARATUS AND SYNCHRONISM ACQUISITION CIRCUIT

[75] Inventor: Takashi Azuma, Tokyo, Japan

[73] Assignee: Kabushiki Kaisha Toshiba, Kawasaki, Japan

[21] Appl. No.: 08/891,273

[22] Filed: Jul. 10, 1997

[30] Foreign Application Priority Data

Jul. 10, 1996 [JP] Japan .................................. 8-180719

[51] Int. Cl.[7] .................................................. H04B 15/00
[52] U.S. Cl. ......................... 375/147; 325/130; 325/137; 325/150
[58] Field of Search .................................. 375/200, 202, 375/206, 208, 224, 285, 344, 147, 130, 137, 150; 370/320, 342

[56] References Cited

U.S. PATENT DOCUMENTS

| | | | |
|---|---|---|---|
| 5,610,939 | 3/1997 | Takahashi et al. ...................... | 375/150 |
| 5,625,641 | 4/1997 | Takakusaki ............................. | 375/137 |
| 5,748,668 | 5/1998 | Tomita et al. .......................... | 375/130 |
| 5,856,997 | 5/1999 | Mochizuki et al. .................... | 375/150 |

*Primary Examiner*—Stephen Chin
*Assistant Examiner*—Shuwang Liu
*Attorney, Agent, or Firm*—Banner & Witcoff, Ltd.

[57] ABSTRACT

Filter coefficients of matched filters are set equivalent to those of a circuit for multiplying spread spectrum code signals of different frequencies, and a correlation value between each of the spread spectrum code signals and spread spectrum signal data. Such correlation values are averaged by their corresponding square circuits and adders. In a maximum-value selection circuit, the averaged correlation values are monitored for a plurality of samples, thus obtaining both an amount of correction of frequency deviation of carrier wave from the frequency of a pass having the largest one of the correlation values (the most matching frequency) and an amount of phase correction of the spread spectrum signal from positional information (phase information) of a sample of the pass having the largest correlation value.

2 Claims, 6 Drawing Sheets

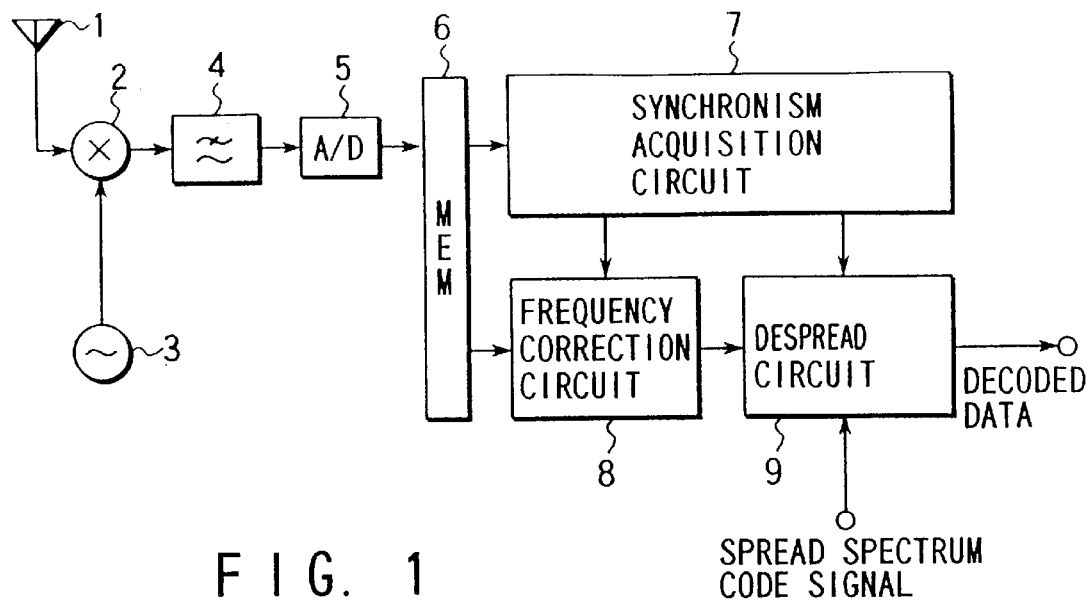
F I G. 1
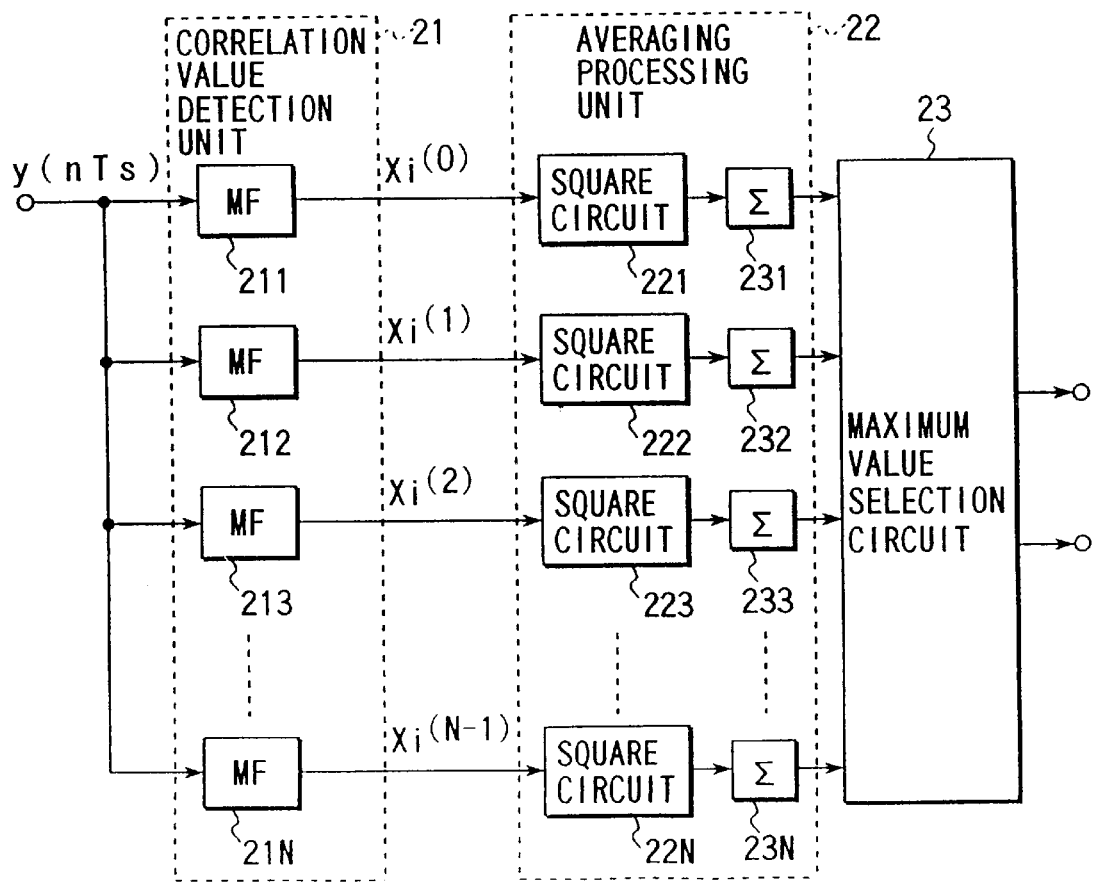
F I G. 2

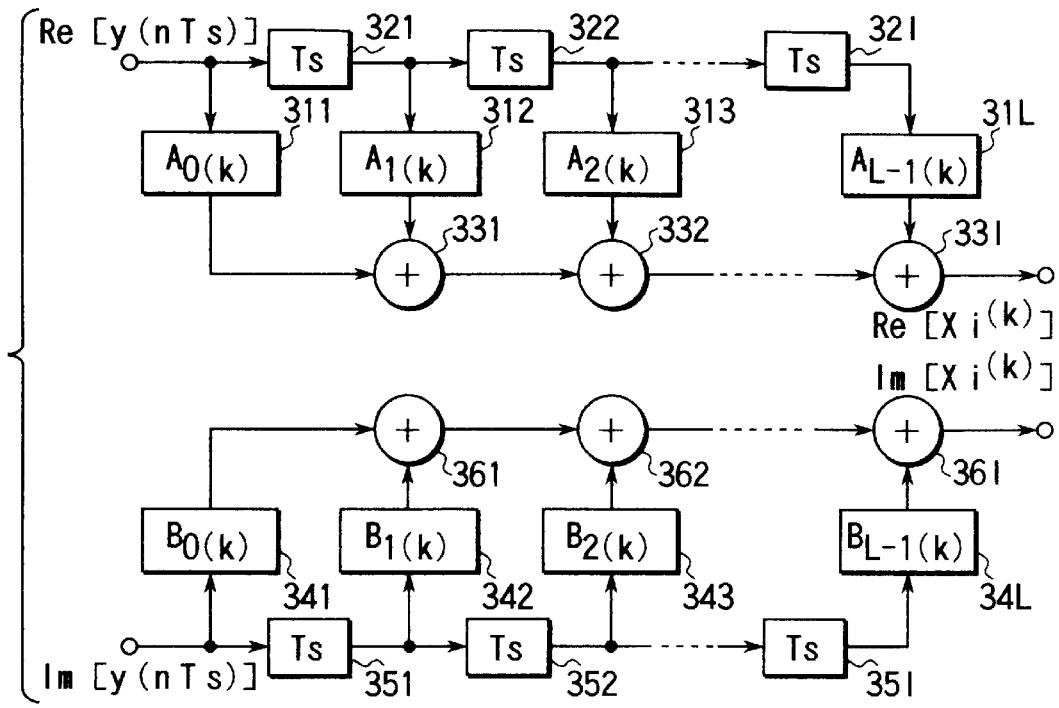
F I G. 3
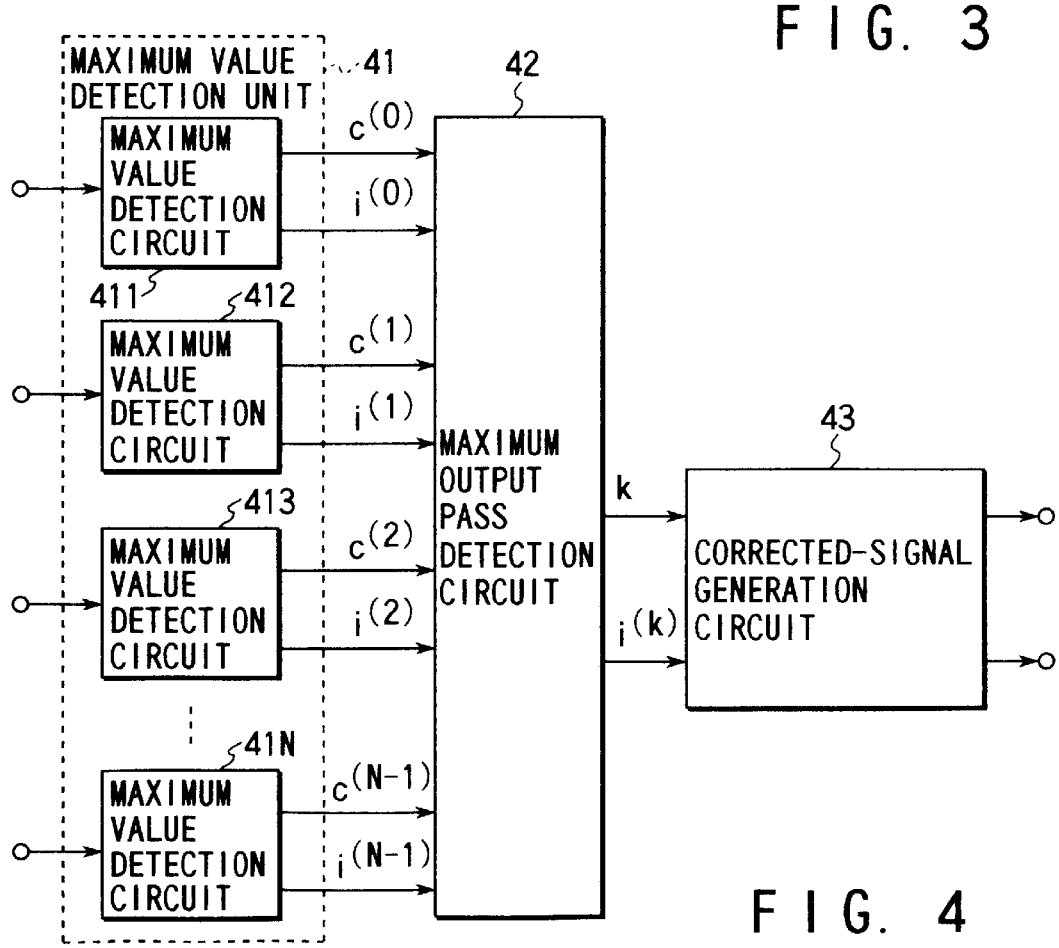
F I G. 4

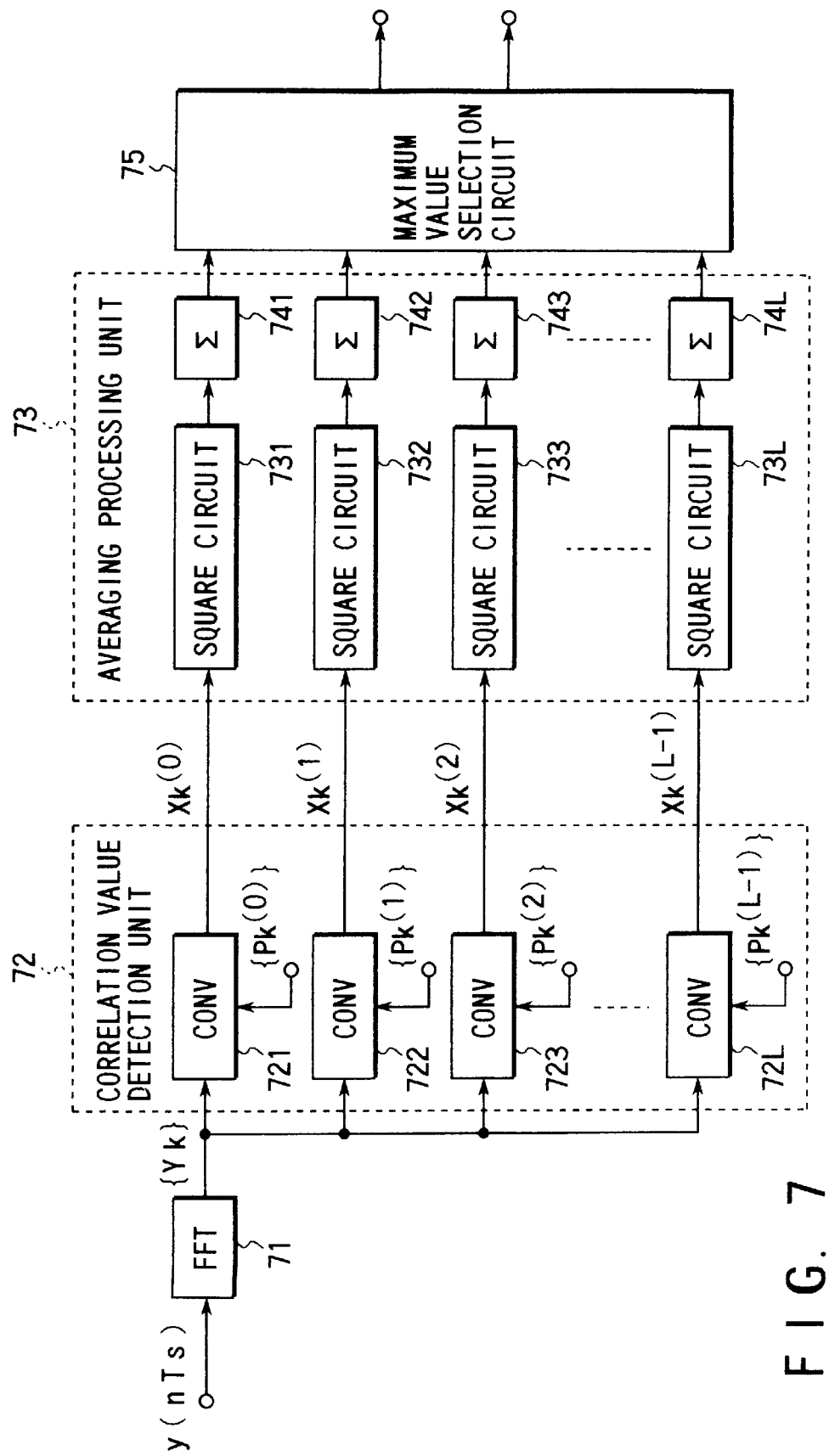
F I G. 7

DIRECT SPREAD SPECTRUM SIGNAL RECEIVING APPARATUS AND SYNCHRONISM ACQUISITION CIRCUIT

BACKGROUND OF THE INVENTION

The present invention relates to a direct spread spectrum signal receiving apparatus and a synchronism acquisition circuit for use in the receiving apparatus.

As is well-known, a direct spread spectrum signal receiving apparatus includes a synchronism acquisition circuit for detecting both an amount of phase correction necessary for despread and an amount of correction of frequency deviation of carrier wave in response to a received spread spectrum signal.

A prior art synchronism acquisition circuit will now be described with reference to the accompanying drawings. FIG. 7 is a block diagram of the arrangement of the synchronism acquisition circuit.

A spread spectrum signal is received by a reception unit of a receiving apparatus (not shown) and then converted to a digital signal by an A/D converter. This digital signal is input to an FFT circuit 71 as spread spectrum signal data y(nTs), where n is an arbitrary constant and Ts is a sampling period of the A/D converter.

In the FFT circuit 71, the spread spectrum signal data y(nTs) undergoes the fast Fourier transform at an N (natural number) point to be transformed from a signal in a time domain to a spread spectrum signal series Yk (k=0, 1, 2, ..., N-1) in a frequency domain, and the spread spectrum signal series Yk is input to a correlation value detector 72. This signal series YK is given as follows.

$$Yk = \sum_{n=0}^{N-1} y(nTs)\exp(-j2\pi kn/N)$$

The correlation value detector 72 includes convolution arithmetic units (CONV) 721 to 72L (L=a constant at which Ts coincides with the period of a spread spectrum code). A spread spectrum code series $Pk^{(i)}$ (i=0, 1, 2, ..., L-1) and spread spectrum signal series Yk are input to each of the convolution arithmetic units 721 to 72L.

The spread spectrum code series $Pk^{(i)}$ is a signal series in the frequency domain, into which a spread spectrum code signal p{(n-1)Ts} having a spread spectrum signal phase iTs is converted by the fast Fourier transform at an N point, using an FFT circuit (not shown). The following are equations expressing spread spectrum code series $Pk^{(i)}$ and $Pk^{(o)}$.

$$Pk^{(i)} = Pk^{(o)}\exp(-jk\omega_o iTs)$$

$$Pk^{(o)} = \sum_{n=0}^{N-1} p(nTs)\exp(-j2\pi kn/N)$$

The convolution arithmetic units 721 to 72L perform a convolution operation for spread spectrum code series $Pk^{(i)}$ and spread spectrum signal series Yk in the frequency domain to obtain a correlation value $Xk^{(i)}$ between them. In other words, the correlation value detector 72 detects a correlation value $Xk^{(i)}$ between spread spectrum code series $Pk^{(i)}$ and spread spectrum signal series Yk whose phases are varied Ts by Ts.

The results of L convolution operations (correlation values $Xk^{(i)}$) so obtained, are illustrated in FIGS. 8A–8D and the equation thereof is given as follows:

$$Xk^{(i)} = \{Yk\} \otimes \{Pk^{(i)}\}$$

$$= \sum_{m=0}^{N-1} YmP_{k-m}{(i)}$$

$$= N\sum_{n=0}^{N-1} y(nTs)p\{(n-i)Ts\}\exp(-jk\omega_o nTs)$$

The correlation values $Xk^{(i)}$ are input to their corresponding square circuits 731 to 73L and squared therein, and the squared values are supplied to their corresponding adders ($\Sigma$) 741 to 74L.

Each of the adders 741 to 74L adds M correlation values $Xk^{(i)}$ the powers of which are converted by its corresponding one of the square circuits 731 to 73L to average the correlation values corresponding to spread spectrum signal data from y(nTs) to y{(n+MN)Ts}. The average value is then input to a maximum-value The average value is then input to a maximum-value selection circuit 75.

The maximum-value selection circuit 75 selects the maximum one of the average values of the correlation values obtained from the adders 741 to 74L. Based on the selected maximum average value, both an amount of phase correction of a spread spectrum signal and that of correction of frequency deviation of carrier wave are obtained.

In the case of FIGS. 8A–8D, the largest correlation value is obtained when i=2 as shown in FIG. 8C. The maximum-value selection circuit 75 thus finds an amount of phase correction of a spread spectrum signal from the phase of the signal when i=2, and obtains an amount of correction of frequency deviation of carrier wave from a difference df between frequency f2, which represents the largest correlation value when i=2, and reference frequency fs.

The amounts of phase correction and correction of frequency deviation of the spread spectrum signal, so obtained, are supplied to a frequency correction circuit and a despread arithmetic circuit (neither of which is shown) at the subsequent stage.

In the prior art synchronism acquisition circuit having the above-described constitution, a convolution operation is performed for the spread spectrum signal data and spread spectrum code signal in the frequency domain, so that the frequency domain necessitates the FFT circuit 71. Since, however, the FFT circuit 71 performs a complicated operation and its size is large, the synchronism acquisition circuit using this circuit will be complicated.

BRIEF SUMMARY OF THE INVENTION

Accordingly, an object of the present invention is to provide a synchronism acquisition circuit which is smaller and simpler in arrangement than that using an FFT circuit.

Another object of the present invention is to provide a direct spread spectrum signal receiving apparatus which is simple in constitution and small in size.

To attain the above objects, there is provided a direct spread spectrum signal receiving apparatus comprising:

correlation value detection means for detecting a correlation value between a received direct spread spectrum signal and each of a plurality of spread spectrum code signals of different frequencies;

synchronism information detection means for monitoring a plurality of correlation values, detected by the correlation value detection means, for each of a plurality of samples of the spread spectrum code signals, and detecting a phase and a frequency of one of the samples having a largest correlation value;

frequency correction means for detecting a frequency deviation caused in the received direct spread spectrum signal based on the frequency detected by the synchronism information detection means, and correcting a frequency of the received direct spread spectrum signal based on the detected frequency deviation; and despread means for performing a despread processing by detecting a phase difference between the received direct spread spectrum signal and the spread spectrum code signal based on the phase of the sample detected by the synchronism information detection means, and multiplying a phase of the direct spread spectrum signal the frequency of which is corrected by the frequency correction means and a phase of the spread spectrum code signal, based on the phase of the sample detected by the synchronism information detection means.

In the direct spread spectrum signal receiving apparatus having the above constitution, a correlation value between a received direct spread spectrum signal and each of a plurality of spread spectrum code signals of different frequencies is detected, and the detected correlation values are monitored for each of samples of the spread spectrum code signals, thus obtaining a phase and a frequency of one of the samples having the largest correlation value. The frequency of the received direct spread spectrum signal is corrected based on the detected frequency, and a despread processing is performed appropriately based on the detected phase.

Consequently, in the direct spread spectrum receiving apparatus, the frequency can be corrected and the despread processing can be performed by a spread spectrum code signal in an appropriate phase, without using any means for the fast Fourier transform.

To attain the above objects, there is also provided a synchronism acquisition circuit comprising:

correlation value detection means for detecting a correlation value between the received direct spread spectrum signal and each of a plurality of spread spectrum code signals of different frequencies;

synchronism information detection means for monitoring a plurality of correlation values, detected by the correlation value detection means, for each of a plurality of samples of the spread spectrum code signals, and detecting a phase of one of the samples having a largest correlation value; and phase difference detection means for detecting a phase difference between the received direct spread spectrum signal and the spread spectrum code signal based on the phase of the sample detected by the synchronism information detection means.

The synchronism information detection means detects a frequency of the one of the samples having a largest correlation value, and the synchronism acquisition circuit further comprises frequency deviation detection means for detecting a frequency deviation caused in the received direct spread spectrum signal.

In the synchronism acquisition circuit having the above constitution, a correlation value between a received direct spread spectrum signal and each of a plurality of spread spectrum code signals of different frequencies is detected, and the detected correlation values are monitored for each of samples of the spread spectrum code signals, thus obtaining a phase and a frequency of one of the samples having the largest correlation value. A frequency deviation of carrier wave of the received direct spread spectrum signal is detected based on the detected frequency, and a phase difference between the received direct spread spectrum signal and the spread spectrum code signal based on the detected phase.

Consequently, in the synchronism acquisition circuit, both the frequency deviation of carrier wave of the received direct spread spectrum signal and the phase difference in spread spectrum code signal necessary for a despread processing, without using any means for the fast Fourier transform. For this reason, the arrangement of the circuit can is simplified and the size thereof can be reduced, and the circuit design can be made easier, with the result that the apparatus can be decreased in size and reduced in manufacturing costs.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing a structure of a direct spread spectrum signal receiving apparatus having a synchronism acquisition circuit according to an embodiment of the present invention;

FIG. 2 is a block diagram of the constitution of the synchronism acquisition circuit shown in FIG. 1;

FIG. 3 is a block diagram of the constitution of a matched filter shown in FIG. 2;

FIG. 4 is a block diagram of the arrangement of a maximum-value selection circuit illustrated in FIG. 2;

FIG. 7 is a block diagram of the constitution of a conventional synchronism acquisition circuit using an FFT circuit.

DETAILED DESCRIPTION OF THE INVENTION

Figure 5A:
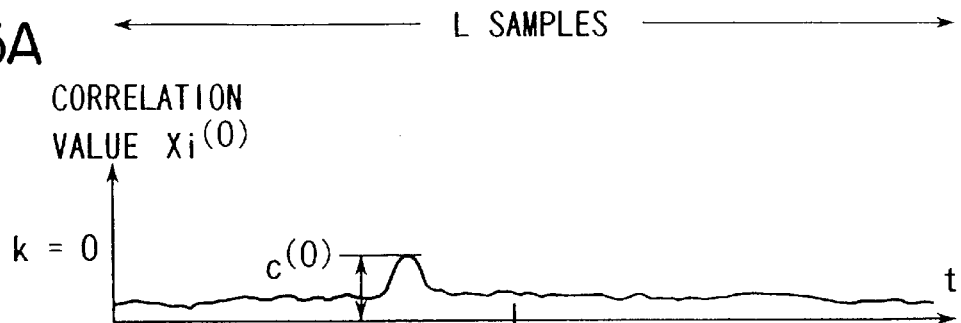
FIGS. 5A–5D are graphs showing correlation values between spread spectrum code signals of different frequencies and spread spectrum signal data in the synchronism acquisition circuit of FIG. 1.
Figure 5B:
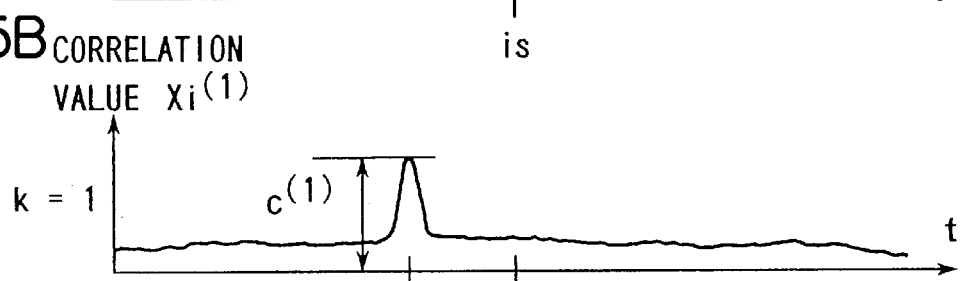
Figure 5C:
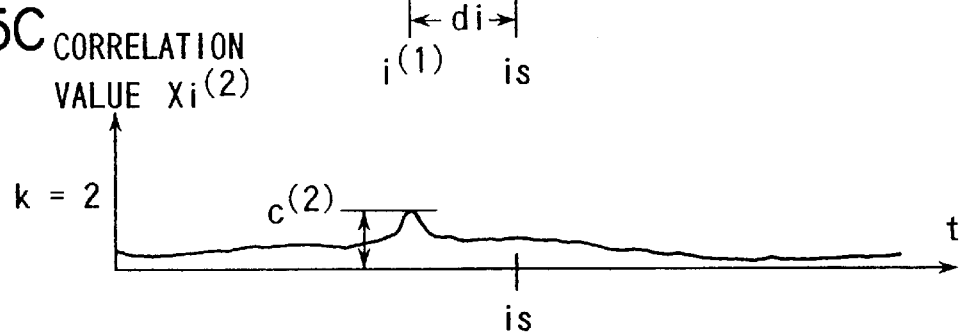
Figure 5D:
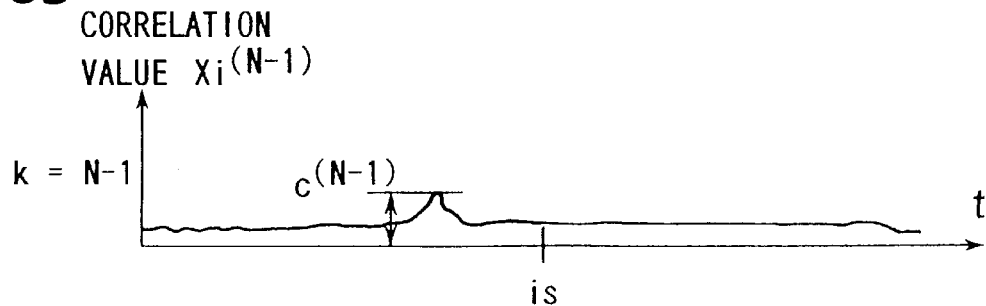

An embodiment of the present invention will now be described with reference to the accompanying drawings.

FIG. 1 illustrates the constitution of a direct spread spectrum signal receiving apparatus having a synchronism acquisition circuit according to the present invention.

A spread spectrum signal transmitted from a transmitting apparatus (not shown) is received by an antenna 1 and supplied to a frequency converter 2. This frequency converter 2 receives a local signal having the same frequency as the carrier frequency of the spread spectrum signal generated from a local signal generator 3.

The frequency converter 2 multiplies the local signal and spread spectrum signal together to convert the carrier frequency of the spread spectrum signal to the baseband frequency.

The frequency-converted spread spectrum signal is supplied to a low-pass filter 4 and filtered to remove unnecessary components of a high-frequency band. The filtered spread spectrum signal is input to an A/D converter 5.

The A/D converter 5 samples and quantizes the filtered signal at sampling frequency Ts to convert it from an analog signal to a digital signal.

The digitally-converted spread spectrum signal is stored temporarily in a memory (MEM) 6 and then supplied to a synchronism acquisition circuit 7 and a frequency correction circuit 8 as spread spectrum signal data y(nTs). The synchronism acquisition circuit 7 is constituted of, e.g., matched filters.

The synchronism acquisition 7 will now be described with reference to FIGS. 2 and 3. FIG. 2 illustrates the constitution of the circuit 7.

The spread spectrum signal data y(nTs) supplied from the memory 6, is input to N matched filters (MF) 211 to 21N (N=natural number) of a correlation value detecting unit 21.

The filter coefficients of the matched filters 211 to 21N are set equivalent to those of circuits for multiplying spread spectrum code signals $pi^{(k)}$ (i=0, 1, 2, . . . , L−1; k=0, 1, 2, . . . , N−1) whose frequencies are varied by $k \omega_0/N$. The spread spectrum code signals $pi^{(k)}$ are expressed as follows:

$$pi^{(k)} = pi^{(o)} \exp(-jk\omega_o iTs/N)$$

$$pi^{(o)} = p(iTs)$$

Each of the matched filters 211 to 21N is constituted as illustrated in FIG. 3. The matched filter divides the spread spectrum signal data y(nTs) into real-part data Re[y(nTs)] and imaginary-part data Im[y(nTs)], and filters each data.

A processing system of the real-part data Re[y(nTs)] includes multipliers (Ai(k)) 311 to 31L, delay circuits (Ts) 321 to 32l, and adders 331 to 33l, while a processing system of the imaginary-part data Im[y(nTs)] includes multipliers (Bi(k)) 341 to 34L, delay circuits (Ts) 351 to 35l, and adders 361 to 36l. L is a constant at which LTs coincides with a period of the spread spectrum code, and l=L−1.

In the real-part data processing system, real-part data Re[y(nTs)] of the spread spectrum signal data y(nTs) supplied from the memory circuit 6 is input to the multiplier 311 and delay circuit 321.

The delay circuits 321, 322, . . . , 32l are connected in series in this order, and each of them delays input data by Ts and sends the delayed data to its corresponding one of the multipliers 312, 313, . . . , 31l.

The multipliers 311, 312, . . . , 31l have multiplication coefficients A0(k), A1(k), . . . , AL−1(k)(described later), respectively, and multiply input data by the coefficients Ai(k). The results of multiplication are added by the adders 331 to 33l, and the results of addition are output as Re[$xi^{(k)}$].

In the imaginary-part data processing system, imaginary-part data Im[y(nTs)] of the spread spectrum signal data y(nTs) supplied from the memory circuit 6 is input to the multiplier 341 and delay circuit 351.

The delay circuits 351, 352, . . . , 35l are connected in series in this order, and each of them delays input data by Ts and sends the delayed data to its corresponding one of the multipliers 342, 343, . . . , 34l.

The multipliers 341, 342, . . . , 34l have multiplication coefficients B0(k), B1(k), . . . , BL−1(k)(described later), respectively, and multiply input data by the coefficients Bi(k). The results of multiplication are added by the adders 361 to 36l, and the results of addition are output as Im[$xi^{(k)}$].

As described above, the coefficients Ai(k) of multipliers 311 to 31l and those Bi(k) of multipliers 341 to 34l are provided so as to generate spread spectrum code signals $pi^{(k)}$ whose frequencies are varied by $k \omega_0/N$ for each of the matched filters 211 to 21N. If the Euler's formula is applied to the spread spectrum code signals $pi^{(k)}$, the coefficients of the real and imaginary parts are obtained by the following equations:

$$Ai^{(k)} = p(iTs)\cos(k\omega_o iTs/N)$$

$$Bi^{(k)} = -p(iTs)\sin(k\omega_o iTs/N)$$

A correlation value $xi^{(k)}$ is obtained from Re[$xi^{(k)}$] and Im[$xi^{(k)}$].

The N correlation values $xi^{(k)}$ obtained from the matched filters 211 to 21N are input to their respective square circuits 221 to 22N of an averaging unit 22 and squared therein. The squared values are then supplied to their corresponding adders (Σ) 231 to 23N.

Each of the adders 231 to 23N adds M correlation values $xi^{(k)}$ powers of which are converted by its corresponding one of the square circuits 221 to 22N to average the correlation values corresponding to the spread spectrum signal data from y(nTs) to y{(n+ML)Ts}. The results of the average of the correlation values (hereinafter referred to as correlation average values) are then input to a maximum-value selection circuit 23.

The maximum-value selection circuit 23 is constituted of a maximum-value detection unit 41 having maximum-value detectors 411 to 41N, a maximum-value output pass detection circuit 42, and a corrected-signal generation circuit 43.

Upon receiving the correlation average values from their respective adders 231 to 23N, the maximum-value detectors 411 to 41N monitor the correlation average values for L samples and detect both the maximum value $c^{(k)}$ of the correlation average values and the position $i^{(k)}$ of the sample having the maximum value $c^{(k)}$. These detection results are input to the maximum-value output pass detection circuit 42.

The maximum-value output pass detection circuit 42 detects a pass having the largest one of the maximum values $c^{(0)}$ to $c^{(N-1)}$ input from the maximum-value detectors 411 to 41N. Assuming, as shown in FIGS. 5A–5D and particularly in FIG. 5B, that a pass of k=1 has the largest one of the maximum values, the circuit 42 supplies the corrected-signal generation circuit 43 with both the information (k=1) of the pass and the position $i^{(1)}$ of the sample corresponding to the pass.

The pass information (k=1) represents a frequency variation caused on a carrier wave. The circuit 43 therefore finds an amount of correction for correcting the frequency variation on a baseband signal based on the detected pass information (k=1) and also an amount of phase correction of spread spectrum signals based on a difference di between the positional information $i^{(1)}$ and reference phase is. The former amount of correction is input to the frequency correction circuit 8, while the latter amount of phase correction is supplied to a despread circuit 9.

The frequency correction circuit 8 corrects the frequency of spread spectrum signal data input from the memory 6 based on the amount of correction of frequency deviation of carrier wave. The frequency-corrected spread spectrum signal data is sent to the despread circuit 9.

The despread circuit 9 multiplies the phases of the frequency-corrected spread spectrum signal data and the spread spectrum code signal based on the amount of phase correction in order to perform a despread processing for the spread spectrum signal data, thus obtaining a decoded signal.

As described above, in the synchronism acquisition circuit, a plurality of matched filters 211 to 21N, whose filter coefficients are set equivalent to those of a circuit for multiplying spread spectrum code signals of different frequencies, are utilized to obtain a correlation value between the frequency set in each of the matched filters 211 to 21N and spread spectrum signal data. Monitoring such correlation values for a plurality of samples, an amount of correction of frequency deviation of carrier wave is obtained from the information of a pass having the largest value (the most matching frequency) and an amount of phase correction of spread spectrum signal is detected from positional information (phase information) of a sample having the largest correlation value of the pass.

Consequently, according to the synchronism acquisition circuit having the above constitution, both the amount of correction of frequency deviation of carrier wave and the amount of phase correction of spread spectrum signal can be obtained without using any FFT circuit, thereby simplifying the arrangement of the circuit and decreasing the size thereof.

Figure 6:
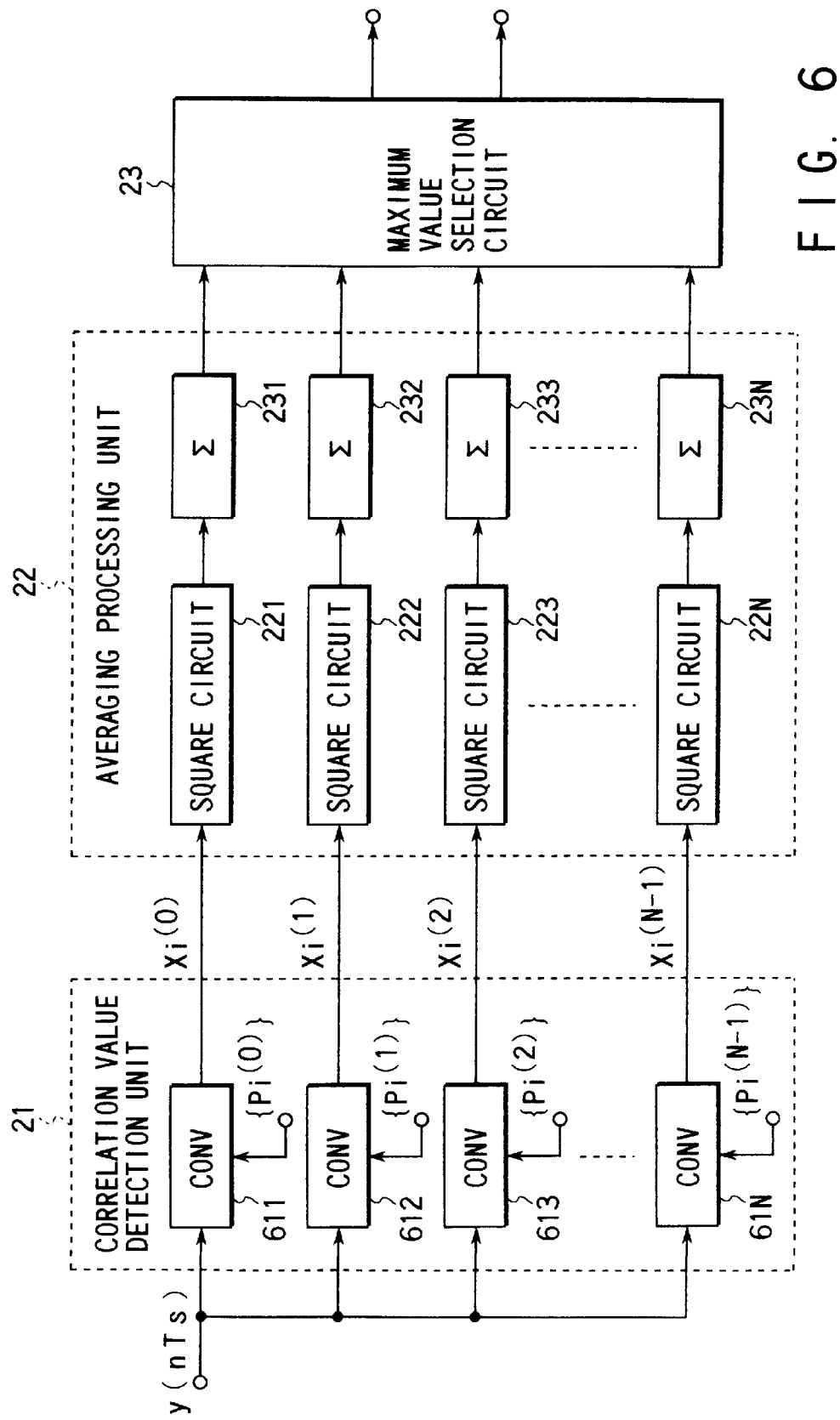
FIG. 6 is a block diagram of another structure of the synchronism acquisition circuit shown in FIG. 1.
Figure 8A:
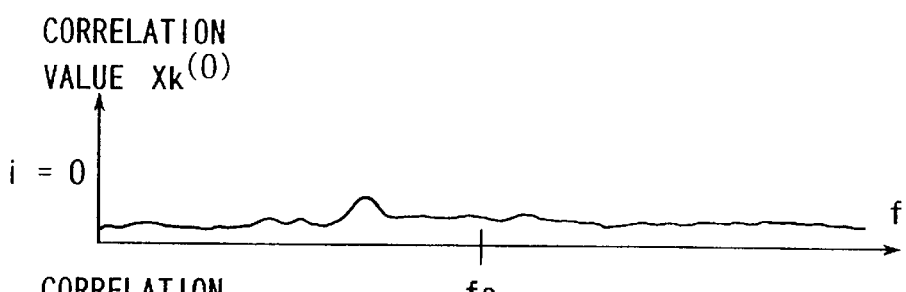
FIGS. 8A–8D are graphs showing correlation values between spread spectrum code signals of different phases and spread spectrum signal data in the conventional synchronism acquisition circuit of FIG. 7.
Figure 8B:
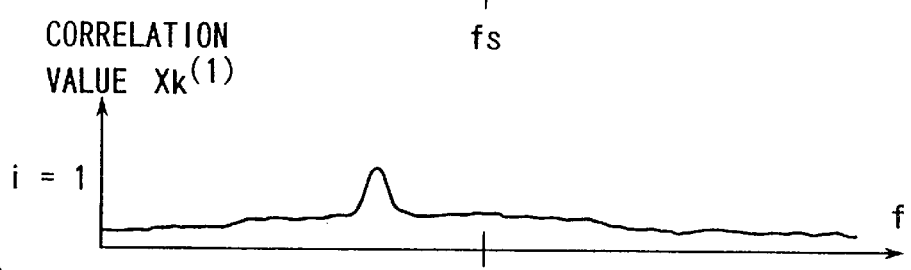
Figure 8C:
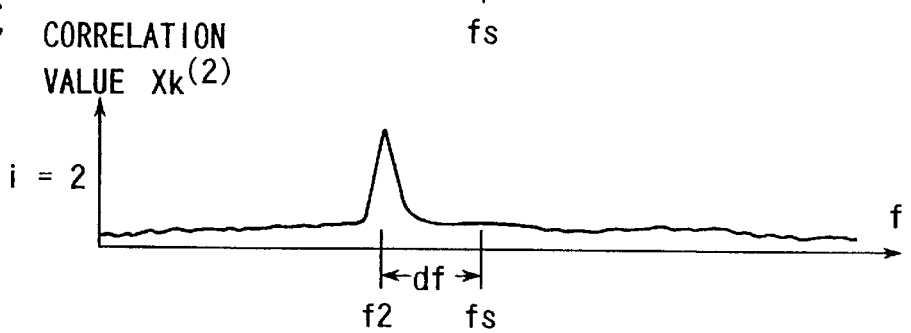
Figure 8D:
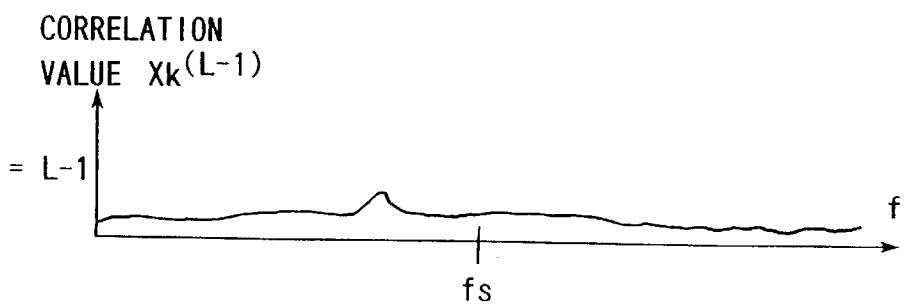

The present invention is not limited to the above embodiment. For example, the matched filters 211 to 21N, which are used in the correlation detecting unit 21 in order to detect a correlation between the spread spectrum signal data and spread spectrum code signal of different frequencies, can be replaced with convolution arithmetic units (CONV) 611 to 61N as shown in FIG. 6.

The convolution arithmetic units 611 to 61N receive preset spread spectrum code series $pi^{(k)}$ of different frequencies and perform a convolution operation for the spread spectrum code series and spread spectrum signal data.

Even though the convolution arithmetic units 611 to 61N are used in the correlation detecting unit 21, the same advantage as when the matched filters are used, can be obtained since both an amount of correction of frequency deviation of carrier wave and an amount of phase correction of spread spectrum signal can be detected without using any FFT circuit.

It is needless to say that various changes and modifications can be made without departing from the scope of the subject matter of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A direct spread spectrum signal receiving apparatus for obtaining desired data by receiving a direct spread spectrum signal, converting the direct spread spectrum signal into a baseband signal, and multiplying the baseband signal by a code which is equal to a spread spectrum code signal used in spread processing on a transmission side, said apparatus comprising:

correlation value detection means for detecting a correlation value between the received directed spread spectrum signal and each of a plurality of spread spectrum code signals of different frequencies;

synchronism information detection means for monitoring a plurality of correlation values, detected by said correlation value detection means, for each of a plurality of samples of the spread spectrum code signals, and detecting a phase and a frequency of one of the samples having a largest correlation value;

frequency correction means for detecting a frequency deviation caused in the received direct spread spectrum signal based on the frequency detected by said synchronism information detection means, and correcting a frequency of the baseband signal based on the detected frequency deviation; and despread means for performing despread processing by detecting a phase difference between the received direct spread spectrum signal and the spread spectrum code signal based on the phase of the sample detected by said synchronism information detection means, making a phase of the baseband signal the frequency of which is corrected by said frequency correction means and a phase of the spread spectrum code signal coincident with each other, based on the phase of the sample detected by said synchronism information detection means, and multiplying the frequency corrected baseband signal and the spread spectrum code signal.

2. The apparatus according to claim 1, wherein said correlation value detection means detects a relevancy between the received direct spread spectrum signal and each of said plurality of spread spectrum code signals of different frequencies, as the correlation value.

* * * * *